Patented July 23, 1940

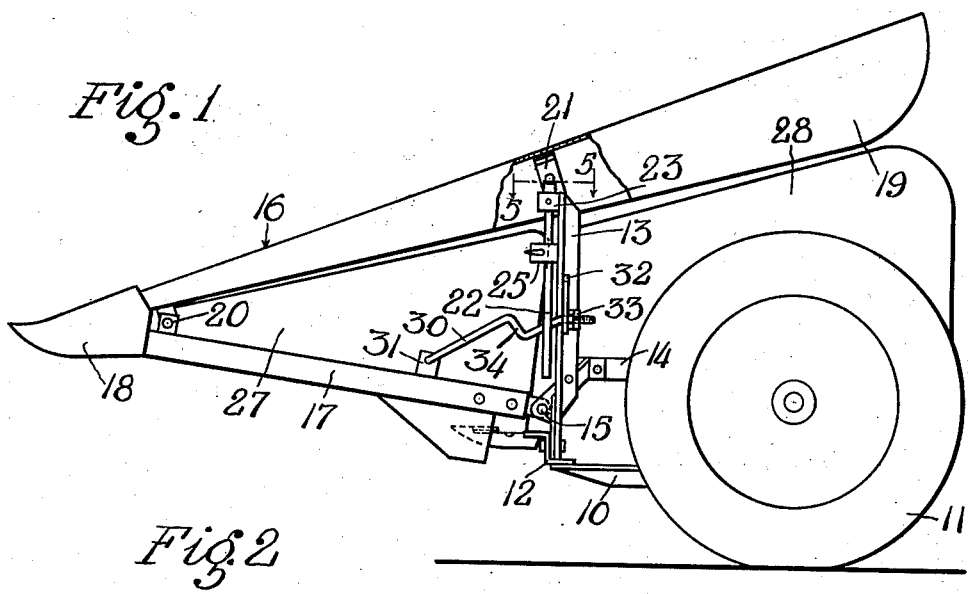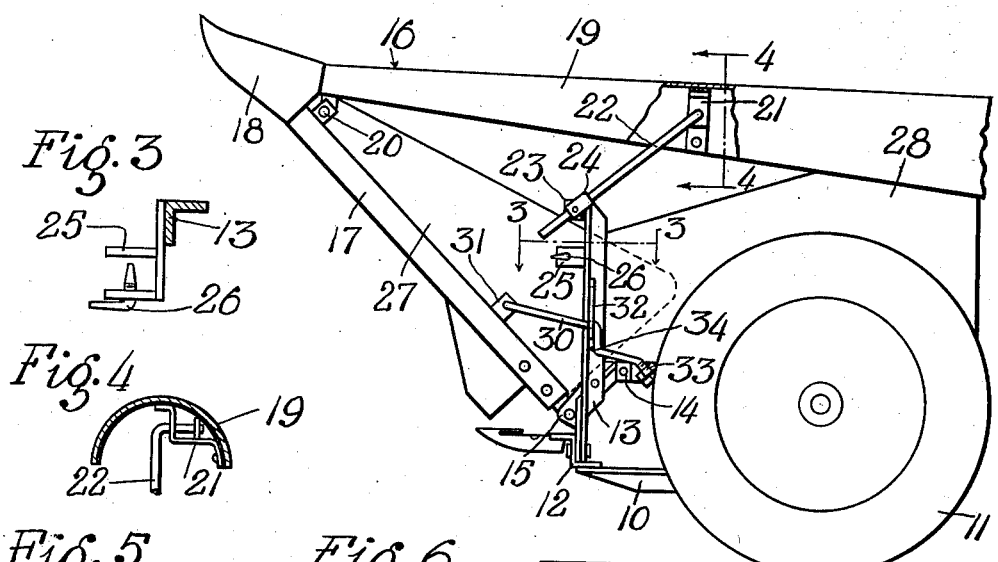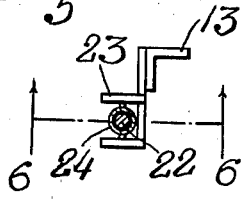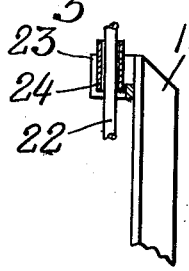

2,209,047

UNITED STATES PATENT OFFICE 2,209,047

HARVESTER

Elmer W. Berg, Berwyn, and Edmund M. Asbridge, Chicago, Ill., assignors to International Harvester Company, a corporation of New Jersey Application April 15, 1939, Serial No. 268,128

7 Claims. (Cl. 56—319)

This invention relates to a harvester and more particularly to an improved means for supporting the outside divider of the harvester in either operative or transport position.

As is well known to those skilled in the art, the outside divider is mounted for vertical movement with respect to the harvester frame from operative to transport position. Movement of the divider to transport position is desirable for folding the divider when the harvester is moved from one position to another, the folding of the divider providing for the passage of the machine through narrow gates and the like.

The principal object of the invention is to provide an improved means for supporting the divider with respect to the frame in either of the aforesaid two positions.

An important object is to provide a simple means in the form of a rod connected at its opposite ends between the divider and the frame and formed with an intermediate portion adapted to engage the frame when the divider is raised to transport position.

And still another object is to provide the means in a manner in which it may be easily engaged with and disengaged from the frame for changing the position of the divider.

Further objects and desirable features of the invention will appear from the following detailed description taken in conjunction with the accompanying sheet of drawings pertaining to a preferred embodiment of the invention.

In the drawing:

Figure 1 is a side elevational view of a portion of a harvester of the binder type illustrating the divider in operative position with respect to the harvester frame;

Figure 2 is a similar view showing the divider raised to transport position;

Figure 3 is a sectional view taken on the line 3—3 of Figure 2, showing a part of the means providing for adjustment of the divider with respect to the frame;

Figure 4 is a sectional view taken on the line 4—4 of Figure 2, showing the cross-sectional shape of the divider and part of the supporting means therefor;

Figure 5 is a sectional view taken on the line 5—5 of Figure 1, showing an additional portion of the supporting means; and, Figure 6 is a sectional view taken on the line 6—6 of Figure 5, illustrating the supporting means for the rod forming part of the adjustable means for the divider.

The harvester chosen for purposes of the illustration is of the type known generally as a binder, and, as illustrated diagrammatically in the drawing, comprises a main harvester frame 10 supported on ground wheels, only one of which is shown, at 11. The forward portion of the frame 10 is provided with the conventional cutting mechanism comprising a Z-bar 12 which carries the conventional guards. The frame 10 further includes at its forward end a vertical support 13 in the form of an angle bar rigidly mounted with respect to the frame and braced by additional frame bars, as at 14.

A supporting bracket 15 is rigidly carried by the frame 10, being secured also to the support 13 and the frame member 14. An outer divider structure 16 is associated with the frame and includes a forwardly extending supporting bar 17, which is pivoted at its rear end to the bracket 15, and which includes at its forward end a ground engaging shoe or runner 18. The divider structure further includes an upwardly and rearwardly inclined divider 19, which is pivoted at its forward end at 20 adjacent the forward end of the bar 17. The divider 19 is preferably formed of sheet metal and is semi-circular in cross-section, tapering from its rearward to its forward end. As best shown in Figure 4, an intermediate portion of the divider is provided with a bracket 21, which pivotally carries one end of a supporting rod 22. In the normal operating position of the divider, the rod 22 extends vertically downwardly, parallel to the supporting member 13 carried by the frame 10. The support 13 carries at its upper end, as best shown in Figure 5, a U-shaped bracket 23 providing a pair of ears between which a collar 24 is trunnioned. The rod 22 passes loosely through the collar 24 and further through a second bracket 25 located below the bracket 23. The bracket 25 consists of a pair of spaced ears, one of which carries a threaded member 26, the threaded portion of which extends through one of the ears and is tapered to engage a portion of the rod 22. The member 26 may be loosened to permit the rod 22 to slide freely in the bracket 25, which necessarily permits vertical adjustment of the divider 19 with respect to the frame 10, the divider pivoting about the pivot point 20 at the forward end of the bar 17. It will be understood, of course, that any conventional means may be provided for permitting adjustment of the divider with respect to the frame.

The divider structure 16 further includes a vertical shield member 27 rigidly carried by the bar 17. The frame 10 rigidly carries a shield member 28, and the two shield members cooperate between the frame and divider structure to substantially enclose the space therebetween.

The improved means for supporting the divider in either operative or transport position comprises a member or rod 30 pivotally connected at one end to a bracket member 31 carried on the bar 17 of the divider structure 16. The rod extends rearwardly toward the frame 10 and passes through a slotted portion or member carried on the support 13, the member or portion being generally indicated at 32. This end of the rod is threaded and is provided with a pair of adjustable members 33 providing stop means engageable with a member or portion 32 when the divider structure is in operative position, as illustrated in Figure 1. The rod 30 is bent intermediate its ends to provide a hook or second stop portion 34 disposed in the plane of the slot formed in the member 32. The hook or bent portion 34 passes through the slot in the member 32 and is adapted to engage or hook over the portion of the member to support the divider structure in transport position, as shown in Figure 2.

Before the divider is raised to transport position, the threaded member 26 carried by the bracket 25 on the supporting member 13 is loosened sufficiently to permit the rod 22 to pass forwardly or upwardly between the bracket ears. The forward end of the divider structure is raised, pivoting about the connection between the bar 17 and bracket 15, and the rod 30 continues to pass rearwardly through the slotted member 32 until the hook or bent portion 34 will, by its own weight, engage a portion of the member 32. It will be readily seen that the improved means in the form of the rod 30 permits the quick and easy raising and lowering of the divider structure 16 with respect to the frame 10. When it is desired to lower the divider structure, the rod 30 is raised to release the hook or bent portion 34 from the member 32, and the rod passes through the slot in the member until the stop 33 engages the member.

As previously mentioned, only a preferred embodiment of the improved structure has been disclosed, and it will be understood that numerous modifications and alterations therein may be made without departing from the spirit and scope of the invention as defined in the appended claims.

What is claimed is:

1. In a harvester having a frame including a vertical support, and an outer divider structure including a forwardly extending bar pivotally carried by the frame for vertical movement and an outer divider carried at its forward end for movement with the bar and inclining upwardly and rearwardly over the frame and support, said divider being adjustably associated with the support for vertical movement from operating position to transport position, the combination with the divider structure of a member connected at one end to the bar and at the other end associated with the support, a stop on the member engaging the support to support the divider in lowered position, and a second stop on the member for engaging the support to support the divider in transport position.

2. In a harvester having a frame including a vertical support, and an outer divider structure including a forwardly extending bar pivotally carried by the frame for vertical movement, and an outer divider carried at its forward end at the forward end of the bar and inclining upwardly and rearwardly over the frame and support, said divider being adjustably associated with the support for vertical movement from operating position to transport position, the combination with the divider structure of a member connected at one end to the bar, a portion on the support being formed with a slot, the other end of the member passing through said slot, a stop on the other end of the member engaging the support portion to support the divider in lowered position, said member being bent intermediate its ends to engage the support portion at the slot therein to support the divider in transport position.

3. In a harvester having a frame including a vertical support, and an outer divider structure movably carried by the frame for vertical movement with respect thereto from operative to transport position, the combination with the divider structure of a member having one end associated with the divider and having its other end associated with the support, a stop at one end of the member normally engaging the support to dispose the divider in operative position, a second stop on the member intermediate its ends and engageable with the support to dispose the divider in transport position.

4. In a harvester having a frame including a vertical support, and an outer divider structure movably carried by the frame for vertical movement with respect thereto from operative to transport position, the combination with the divider structure of a plate carried by the support and formed with a vertical slot, a member connected at one end to the divider and passing through the slot, a stop at the other end of the member engaging the plate when the divider is disposed in operative position, said member having a portion intermediate its ends bent in the plane of the slot and adapted to pass therethrough to engage the plate thereat when the divider is disposed in transport position.

5. In a harvester having a frame including a vertical support, and an outer divider structure movably carried by the frame for vertical movement with respect thereto from operative to transport position, the combination with the divider structure of a plate carried by the support and formed with a vertical slot, a member connected at one end to the divider and passing through the slot, a stop at the other end of the member engaging the plate when the divider is disposed in operative position, a second stop on the member intermediate its ends and disposed in the plane of the slot and adapted to pass therethrough to engage the plate thereat when the divider is disposed in transport position.

6. In a harvester having a frame and an outer divider movable from operative to transport position, means for supporting the divider in either of said positions, comprising a slotted member on the frame, a second member connected at one end to the divider and extending through the slotted member, a stop at the other end of the second member and engaging the slotted member when the divider is in operative position, and a second stop on the second member intermediate its ends and adapted to pass through and engage the slotted member when the divider is in transport position.

7. In a harvester having a frame and an outer divider movable from operative to transport position, means for supporting the divider in either of said positions, comprising a member connected at one end to the divider and adapted at its other end to engage a portion of the frame when the divider is in operative position, said member being bent intermediate its ends to form a hook portion adapted to engage a portion of the frame when the divider is in transport position.

ELMER W. BERG.
               EDMUND M. ASBRIDGE.